United States Patent
Doll et al.

(10) Patent No.: US 6,971,701 B2
(45) Date of Patent: Dec. 6, 2005

(54) DEVICE FOR RETAINING AN INSTRUMENT CLUSTER AND INSTRUMENT PANEL

(75) Inventors: Volker Doll, Ranschbach (DE); Andreas Adel, Rheinzabem (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 108 days.

(21) Appl. No.: 10/948,952

(22) Filed: Sep. 23, 2004

(65) Prior Publication Data

US 2005/0082866 A1  Apr. 21, 2005

Related U.S. Application Data

(63) Continuation of application No. PCT/EP03/03191, filed on Mar. 27, 2003.

(30) Foreign Application Priority Data

Mar. 27, 2002 (DE) ................ 102 14 038

(51) Int. Cl.$^7$ .............................................. B62D 25/14
(52) U.S. Cl. .............................. 296/72; 296/70; 73/431
(58) Field of Search ................... 296/72, 70; 180/90; 340/815.4; 248/27.1, 27.3; 435/29; 73/431; 439/374, 248, 247; 345/7; 362/489; 29/869; D12/114; 701/36

(56) References Cited

U.S. PATENT DOCUMENTS

| | | | |
|---|---|---|---|
| 3,270,831 A | * | 9/1966 | Woofter et al. ............ 180/90 |
| 3,992,070 A | | 11/1976 | Dunn et al. |
| D261,752 S | * | 11/1981 | Iwakura .................. D12/114 |
| 5,495,076 A | * | 2/1996 | Davis ....................... 180/90 |
| 5,527,187 A | * | 6/1996 | Jurasek et al. ............ 439/247 |
| 5,631,141 A | * | 5/1997 | Sonek et al. ............... 435/29 |
| 5,672,823 A | * | 9/1997 | Lachmann et al. .......... 73/431 |
| 5,788,532 A | * | 8/1998 | Takiguchi et al. ......... 439/374 |
| 5,825,338 A | * | 10/1998 | Salmon et al. ............... 345/7 |
| 5,997,161 A | * | 12/1999 | Stringfellow et al. ....... 362/489 |
| 6,048,020 A | * | 4/2000 | Gronowicz et al. .......... 296/70 |
| 6,055,857 A | * | 5/2000 | Kerchaert .................. 73/431 |
| 6,062,888 A | * | 5/2000 | Takiguchi ................. 439/248 |
| 6,108,905 A | * | 8/2000 | Nishitani et al. ............ 29/869 |
| 6,236,919 B1 | * | 5/2001 | Corbin et al. ............... 701/36 |
| 6,314,810 B1 | * | 11/2001 | Kerchaert .................. 73/431 |
| 6,433,701 B1 | * | 8/2002 | Simon et al. ............. 340/815.4 |

FOREIGN PATENT DOCUMENTS

| | | |
|---|---|---|
| DE | 19 21 386 U | 6/1965 |
| DE | 3721289 A1 | 1/1989 |
| FR | 2 670 165 A | 6/1992 |
| GB | 381 825 A | 10/1932 |

* cited by examiner

Primary Examiner—Kiran B. Patel
(74) Attorney, Agent, or Firm—Martin Fleit; Paul D. Bianco; Fleit Kain Gibbons Gutman Bongini & Bianco P.L.

(57) ABSTRACT

A device for retaining an instrument cluster having a member to release a snap connection, and a member to eject the instrument cluster in the direction of a vehicle interior, whereby the release of the snap connection and the ejection of the instrument cluster can be actuated from the vehicle interior.

16 Claims, 6 Drawing Sheets

DEVICE FOR RETAINING AN INSTRUMENT CLUSTER AND INSTRUMENT PANEL

RELATED APPLICATION

This application is a continuation of International Application No. PCT/EP03/03191, filed Mar. 27, 2003, the contents of which are here incorporated by reference in their entirety. Applicants claims the benefits of 35 USC §120.

BACKGROUND OF THE INVENTION

1. Field of the Invention

The invention relates to a device for retaining an instrument cluster and an instrument panel, and a procedure for dismounting an instrument cluster.

2. Prior Art

Various mountings for instrument clusters and procedures for dismounting instrument clusters are known from the prior art. Depending on the type of vehicle, dismounting an instrument cluster generally requires one or more parts of the interior trim to be dismounted, in order to detach the fastening that holds the instrument cluster to the instrument panel.

For example, dismounting firstly requires the lower dash cover to be removed, in order to release the instrument cluster and then to press it out of the instrument panel. A disadvantage of this process is the significant time and cost required to replace a defective instrument cluster.

An instrument panel is known from DE 37 21 289 A1, which features dismountable, fitted individual instruments and units instead of an instrument cluster. The dashboard features integrated electric current conductors for this purpose, which contact the electrical connections assigned to an instrument/unit when it is inserted. Each of the instruments/units features a mounting bracket, which comprises a retainer and a protruding clip tension spring, and which coincides with the allocated cut-out hole in the dashboard. This type of detachable fastening allows the instruments to be easily replaced.

However, a disadvantage of this method lies in the visual appearance of the cockpit and the safety of the vehicle occupants, for example in the case of a collision, since the individual instruments cause an uneven and thus aggressive impact surface to be formed. Moreover, individual instruments may become detached in a collision, if the protruding clip tension spring is unable to cope with the forces involved. A further significant risk of injury arises in a case such as this as a result of individual instruments moving in an uncontrolled manner within the vehicle interior.

SUMMARY OF THE INVENTION

The task that forms the basis of this invention is therefore to create a device to retain an instrument cluster and an instrument panel, which allows for the simplest possible dismounting of the instrument cluster, while avoiding the disadvantages of the prior art.

The task that forms the basis of the invention is solved through the features of the AS described herein. Preferred embodiments of the invention are indicated in the following description.

The invention enables an instrument cluster to be dismounted from within the vehicle interior, without requiring larger parts of the interior trim to be dismounted for this purpose. To achieve this, the instrument cluster is fastened to its support frame by means of a snap connection. To dismount the instrument cluster, the snap connection is released by a mechanism, which is to be activated from the vehicle interior. Thereupon, an ejection motion of the instrument cluster takes place, whereby an actuating force, which is also initiated from the vehicle interior, is diverted into the direction of ejection.

According to a preferred embodiment of the invention, a detent hook or a detent clip is provided on the support frame for the instrument cluster. In the course of mounting the instrument cluster, it is pushed into the support frame from the front, so that a protruding snap catch on the instrument cluster travels under the detent hook or detent clip, where it then locks into place.

At the same time, the rear part of the instrument cluster lies up against the support frame, so that it is mechanically held in position by the support frame and the snap connection, thereby connecting it firmly and securely to the instrument panel. To dismount the instrument cluster, this snap connection is released by a mechanism activated from within the vehicle interior, whereby the detent hook or detent clip is bent up in its elastic, pliable region, for example, thereby releasing the snap catch.

An actuating force is then initiated, also from within the vehicle interior, in order to push the instrument cluster, which has now been released, out of the support frame. In this process, the instrument cluster is preferably pushed out at least far enough to make it possible to grasp it from the front with bare hands and then fully extract it from the support frame of the instrument cluster. For example, the ejection mechanism pushes the instrument cluster out of the so-called molded skin.

According to a preferred embodiment of the invention, release of the snap connection is effected by means of a lever, which is pivoted on a shaft, which is arranged on the support frame. This lever has an actuating projection at one end, which is used for bending up the detent hook or detent clip, in order to release the snap connection. At its other end, the lever is designed to initiate the actuating force, in order to push the actuating projection under the detent hook or detent clip.

According to a preferred embodiment of the invention, in the mounted state of the instrument cluster this end of the lever is arranged opposite a hole in the instrument panel, through which a screwdriver, for example, can be inserted. By means of the screwdriver, it is then possible to exert an actuating force on this end of the lever from within the vehicle interior, which causes the actuating projection to travel under the detent hook or detent clip and bend this up, so that the snap connection is released.

According to a further preferred embodiment of the invention, a further rotational movement of the lever following release of the snap connection results in the impact of a cross bar, which is provided on the lever, on the rear side of the instrument cluster. This impact causes the actuating force exerted on the lever from within the vehicle interior by means of a screwdriver, for example, to be diverted into the direction of ejection of the instrument cluster, so that, by virtue of the released snap connection, the instrument cluster is pushed out of the dash panel.

According to a further preferred embodiment of the invention, the actuating projection has a rising inclination, which facilitates the travel under, and bending up, of the detent element.

According to a further preferred embodiment of the invention, a spring element, for example, a leaf spring, is arranged in the region of the impact generated by the cross bar of the lever upon ejection of the instrument cluster. The spring element has a range of travel, which is at least sufficient for the release movement of the hook. In the mounted state, the spring element exerts a force on the cross bar in a direction contrary to the release movement. This causes the other end of the lever to be pressed against a limit stop, so that the lever in the mounted state features a clearly definable position and is unable to rattle. Preferably, this limit stop is formed by a detent hook.

In this preferred embodiment of the invention, the course of movement for the release and the ejection of the instrument cluster is effected in such a way, that the actuating force against the spring resistance of the spring element moves the lever in the direction of release, so that the actuating projection travels under the detent element and bends it up. Once the snap connection has been fully released, the counterforce of the spring element no longer applies, since the abutment previously formed by the snap connection is no longer present. Upon release of the snap connection, the instrument cluster is then pushed out by virtue of the impact generated between the cross bar and the instrument cluster, and between the cross bar and the spring element, respectively.

BRIEF DESCRIPTION OF THE DRAWINGS

The following paragraphs provide a more detailed explanation of a preferred embodiment of the invention with reference to the drawings. The drawings show.

DETAILED DESCRIPTION OF PREFERRED EMBODIMENTS OF THE INVENTION

Figure 1:
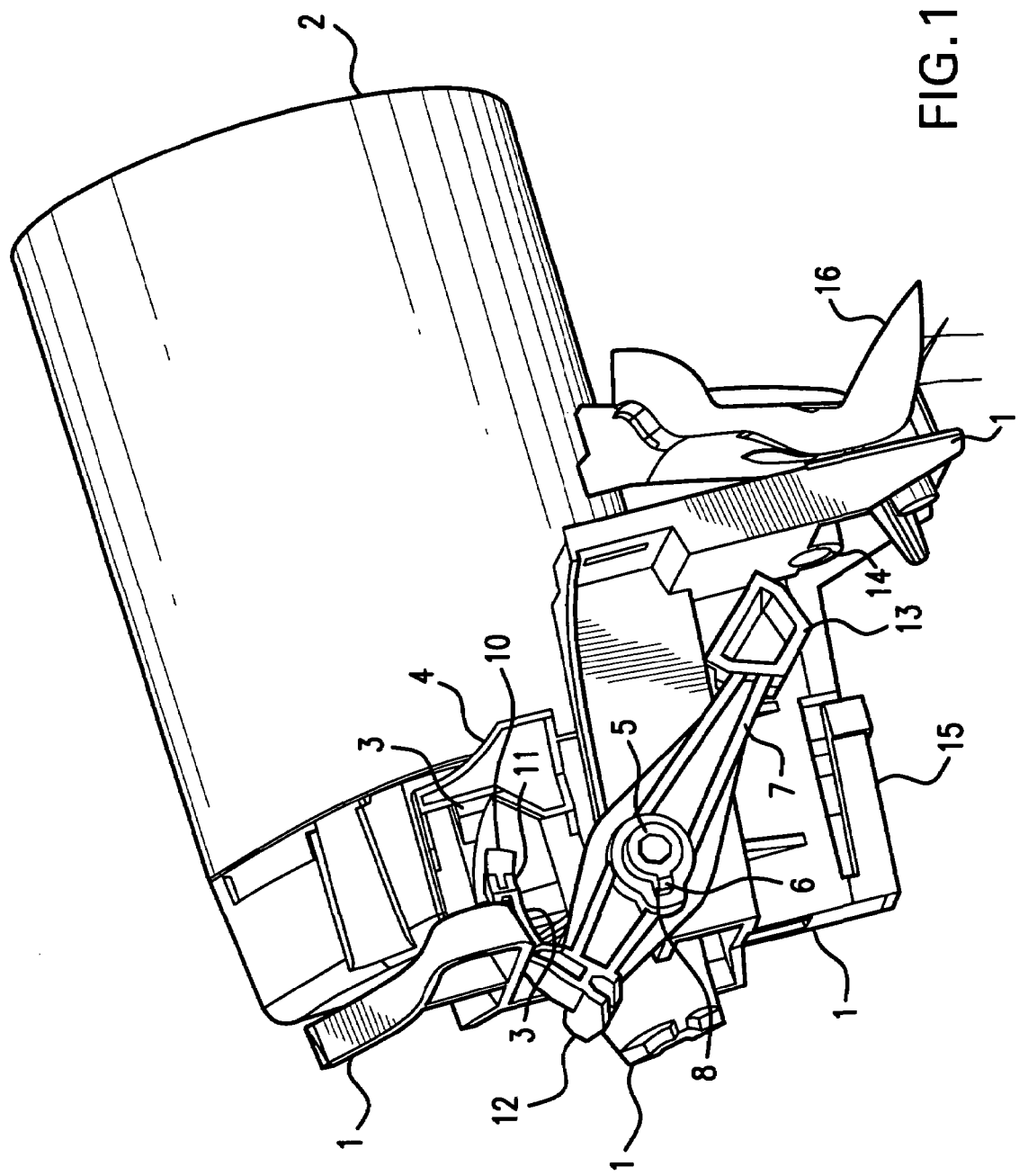
FIG. 1 a perspective view of a mounting of an instrument cluster upon installation, FIG. 2 a perspective view of the mounting of FIG. 1 in the initial position, i.e. in a mounted state, FIG. 3 a perspective view of the mounting of FIG. 1 following release of the snap connection, FIG. 4 a perspective view of the mounting of FIG. 1 upon ejection of the instrument cluster, FIG. 5 a developed view of the release and ejection process of FIGS. 1 to 4, FIG. 6 a horizontal projection of an instrument panel, which features a mounting and an instrument cluster in accordance with FIGS. 1 to 5.

FIG. 1 shows support frame 1 for instrument cluster 2. Instrument cluster 2 has protrusion 3. In the course of installing instrument cluster 2, i.e. when inserting instrument cluster 2 in support frame 1, protrusion 3 travels under clip 4 of support frame 1 and then locks into the position shown in FIG. 1.

Instrument cluster 2 is then fastened in position by the snap connection formed by protrusion 3 and clip 4 on one side, and by support frame 1 on the other side. To avoid a so-called double fit, rubber naps or similar items are preferably provided on support frame 1 or on the rear delimitation of instrument cluster 2, for example.

Shaft 5 with nib 6 is arranged on support frame 1. Lever 7 with notch 8 is mounted on shaft 5 in such a way, that notch 8 and nib 6 are aligned with one another.

On one of its ends, lever 7 has actuating projection 9, which is used to release the snap connection formed by protrusion 3 and clip 4. Actuating projection 9 features overhang 10 and rising inclination 11 for this purpose.

At the end with actuating projection 9, lever 7 also features cross bar 12. Cross bar 12 serves to generate an impact with the rear side of instrument cluster 2, or with a spring element provided on the rear side of instrument cluster 2, respectively, in order to transmit an ejection force onto instrument cluster 2.

At the opposite end to cross bar 12 and actuating projection 9, lever 7 has receiver 13 to receive a tool, such as a screwdriver, for example, which is to be conducted through hole 14 in instrument panel 16 from the vehicle interior.

Support frame 1 also features detent hook 15, which serves to fasten lever 7 in its initial position, i.e. in the mounted state of instrument cluster 2. This shall be further clarified in the following paragraphs with reference to FIG. 2.

Figure 2:
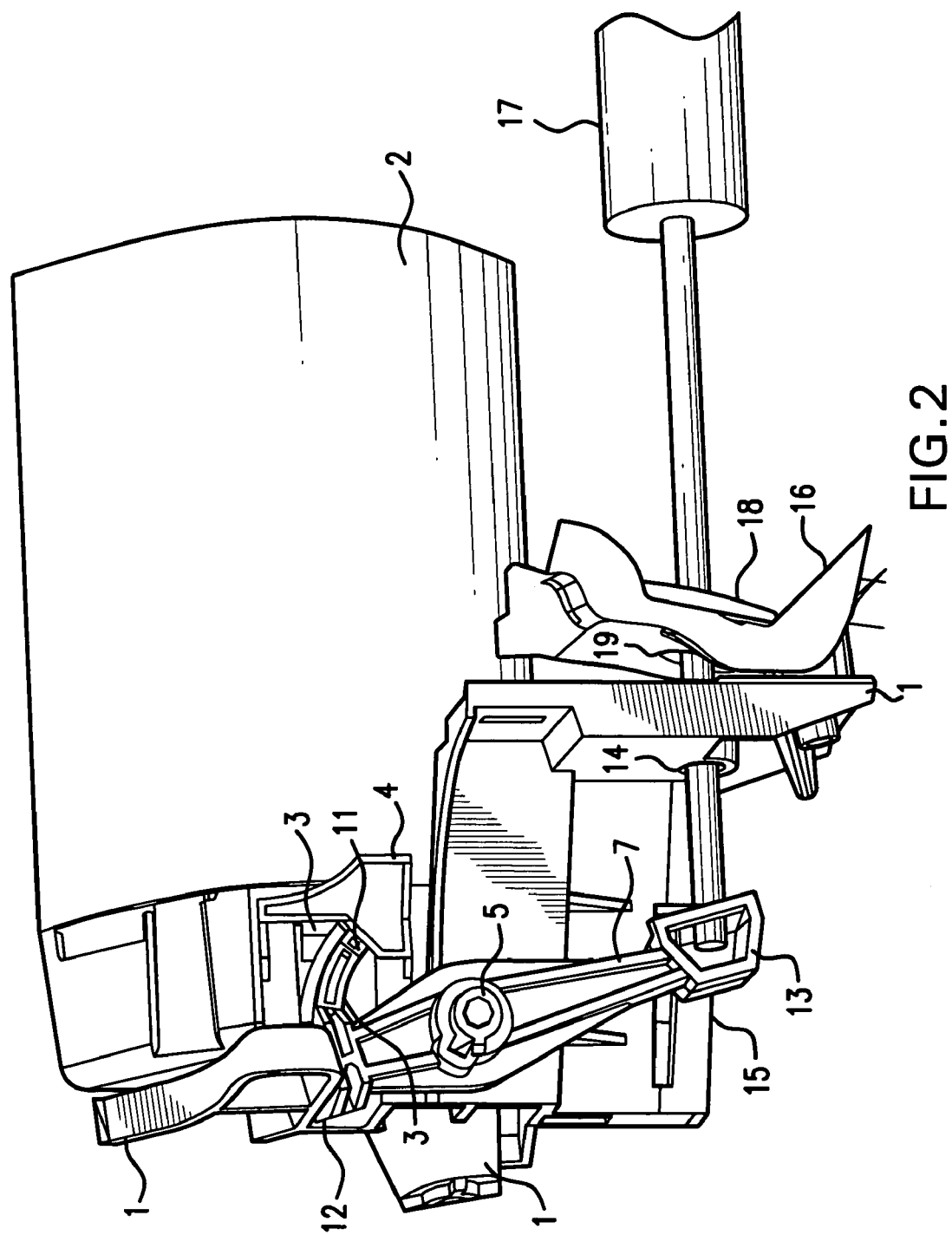

FIG. 2 shows the view of FIG. 1, after lever 7 has been rotated in a clockwise direction upon mounting. The lever has been rotated to such a degree, that overhang 10 of actuating projection 9 has moved under clip 4, though this is not the case for rising inclination 11, which is located directly in front of clip 4 in the mounted state.

In this position, cross bar 12 does not yet generate an impact with the rear side of instrument cluster 2, but is instead distanced from the rear side of instrument cluster 2 by a release length. This release length is preferably bridged by a spring element, which is not shown in FIG. 2, which, in the mounted state, exerts a force on lever 7 in an anticlockwise direction. This force is absorbed by detent hook 15 at the other end of lever 7, so that lever 7 is mechanically fastened and cannot rattle.

To dismount instrument cluster 2, screwdriver 17 or a similarly shaped tool is used. Screwdriver 17 is pushed through a hole in trim strip 18 and corresponding hole 19 in instrument panel 16 as well as through hole 14 in support frame 1, so that the tip of screwdriver 17 reaches receiver 13 of lever 7.

The user can then exert an actuating force via screwdriver 17, which takes effect on lever 7 by way of receiver 13. The initial result of this actuating force is a release of the snap connection. This is shown in FIG. 3.

Figure 3:
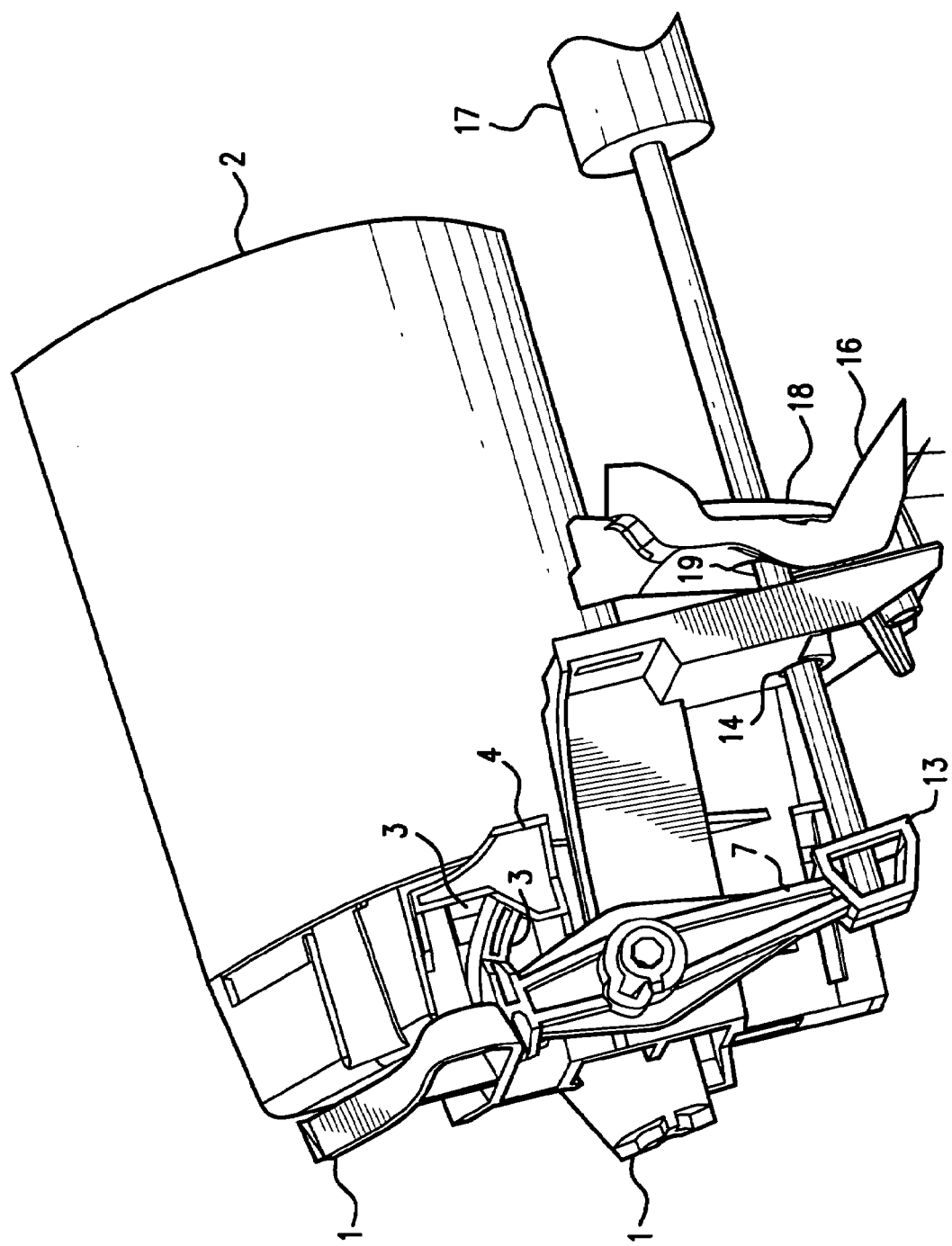

FIG. 3 shows this released state. Due to the actuating force, lever 7 has been turned in a clockwise direction, so that rising inclination 11 (cf. FIGS. 1 and 2) has moved under clip 4. Due to rising inclination 11 moving under clip 4, clip 4 has deformed, i.e. clip 4 has bent up, so that protrusion 3 no longer forms a buffer to clip 4, meaning that the corresponding snap connection has been released. In this position, cross bar 12 comes into impact with the rear side of instrument cluster 2, so that ejection can now be effected. This is shown in FIG. 4.

Figure 4:
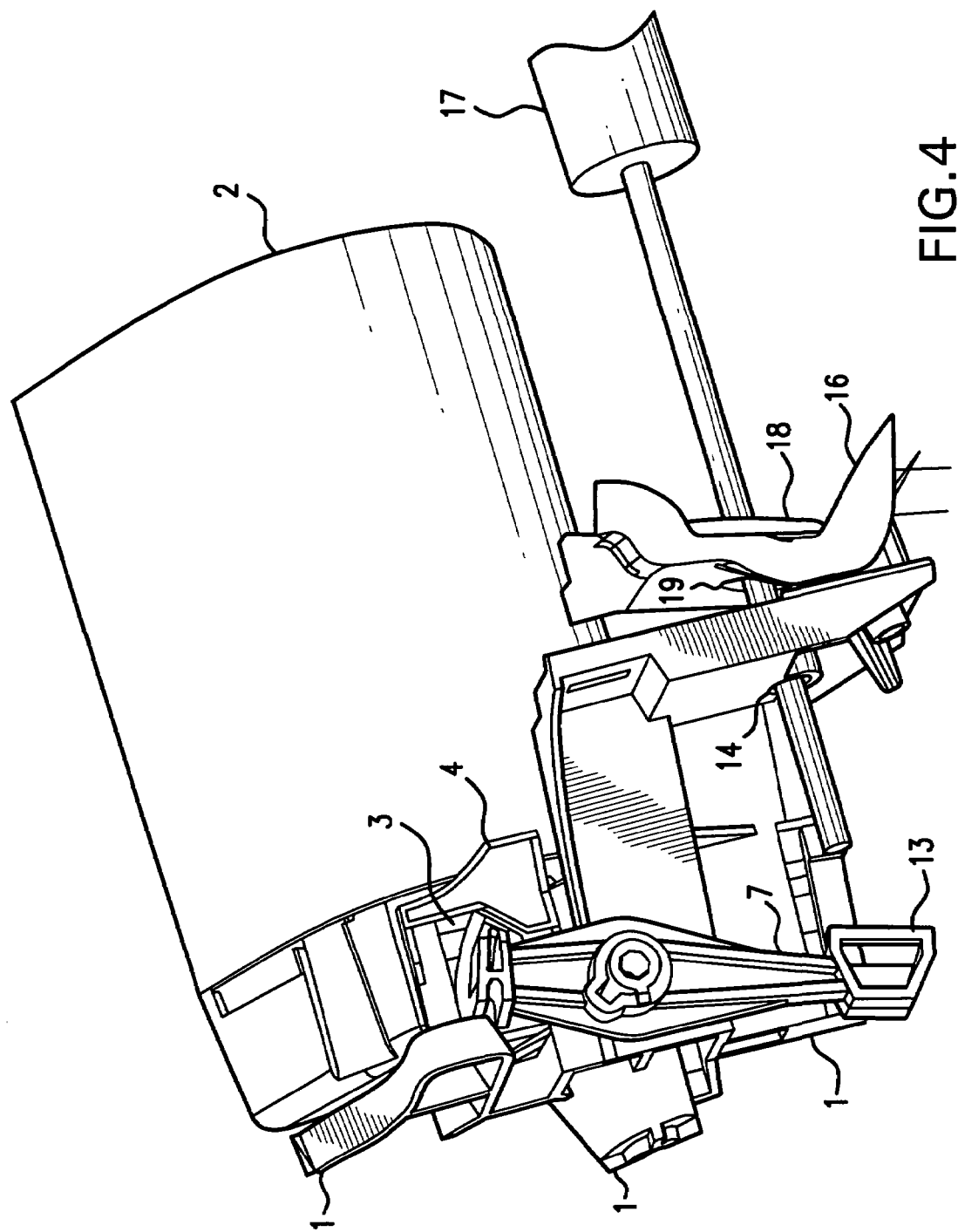

FIG. 4 shows the state after the ejection of instrument cluster 2. In this state, lever 7 has been turned in a clockwise direction to such an extent, that practically all of actuating projection 9 has moved under clip 4. Due to this further rotation, cross bar 12 has pushed instrument cluster 2 slightly out of the support frame, to the extent that instrument cluster 2 is now comfortably within reach from the vehicle interior and can be manually extracted from support frame 1. Screwdriver 17 is then also extracted.

Instrument cluster 2 can then be repaired or replaced. Upon insertion of instrument cluster 2, lever 7 is turned back in an anticlockwise direction. This movement of lever 7 is restricted by detent hook 15, so that the mounted state of instrument cluster 2 shown in FIG. 2 materializes once again.

Figure 5:
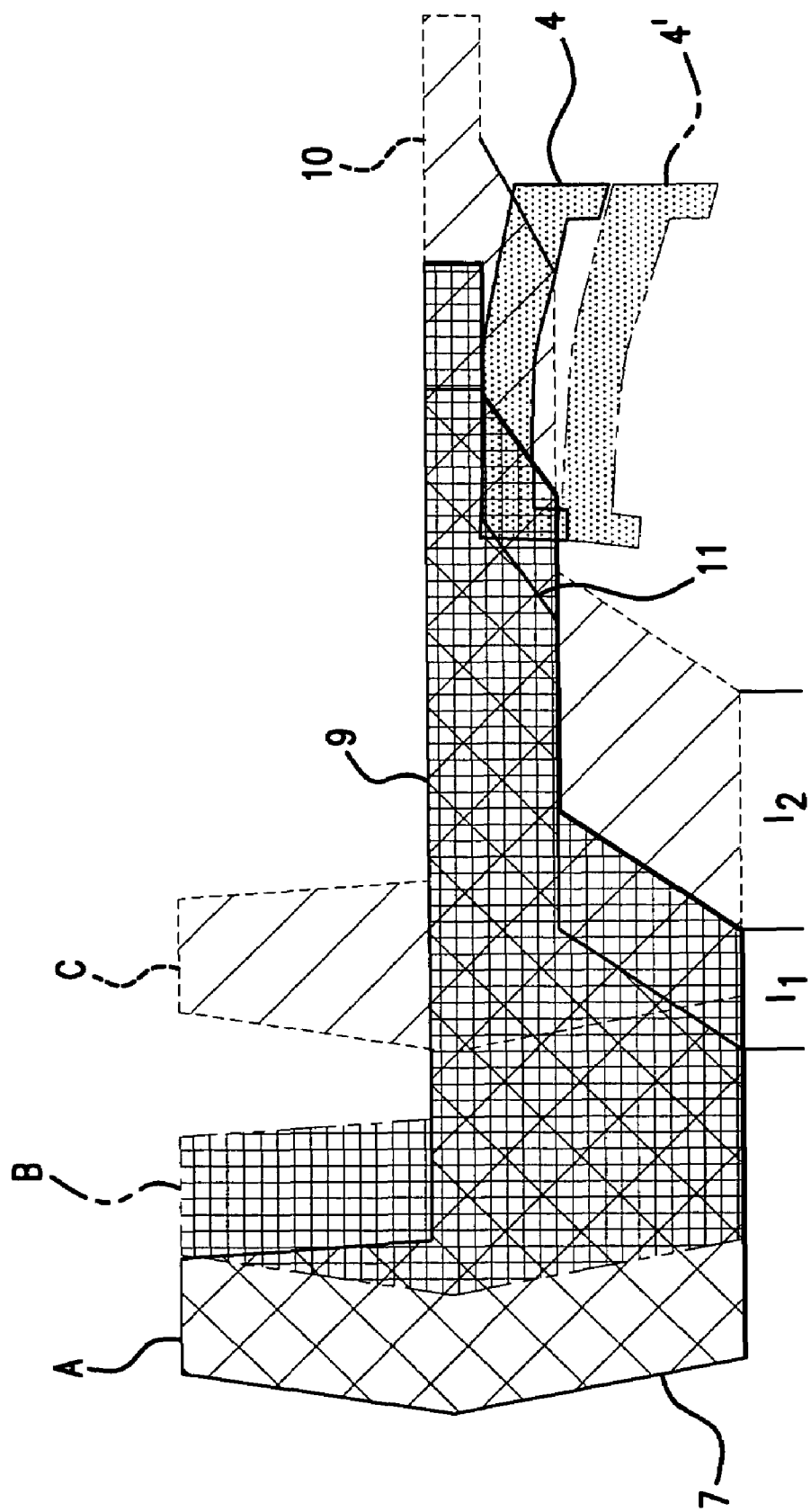

FIG. 5 shows a developed view of the release and ejection process of FIGS. 1 to 4. In the initial position designated as A (cf. FIG. 2), clip 4 is positioned immediately in front of rising inclination 11. In this position, clip 4 rests on overhang 10.

If lever 7 is now rotated from the initial position shown in FIG. 2 to the release position (cf. FIG. 3), then actuating projection 9 of lever 7 travels release length $l_1$, i.e. clip 4 ascends rising inclination 11 to reach the position designated by 4'. The lifting of clip 4 serves to release the snap connection formed with protrusion 3.

If, starting from the released position, the lever is rotated further in order to eject the instrument cluster (cf. FIG. 4), then actuating projection 9 travels ejection length $l_2$. Instrument cluster 2 is thereby pushed out by this ejection length, amounting to 10 mm, for example.

Figure 6:
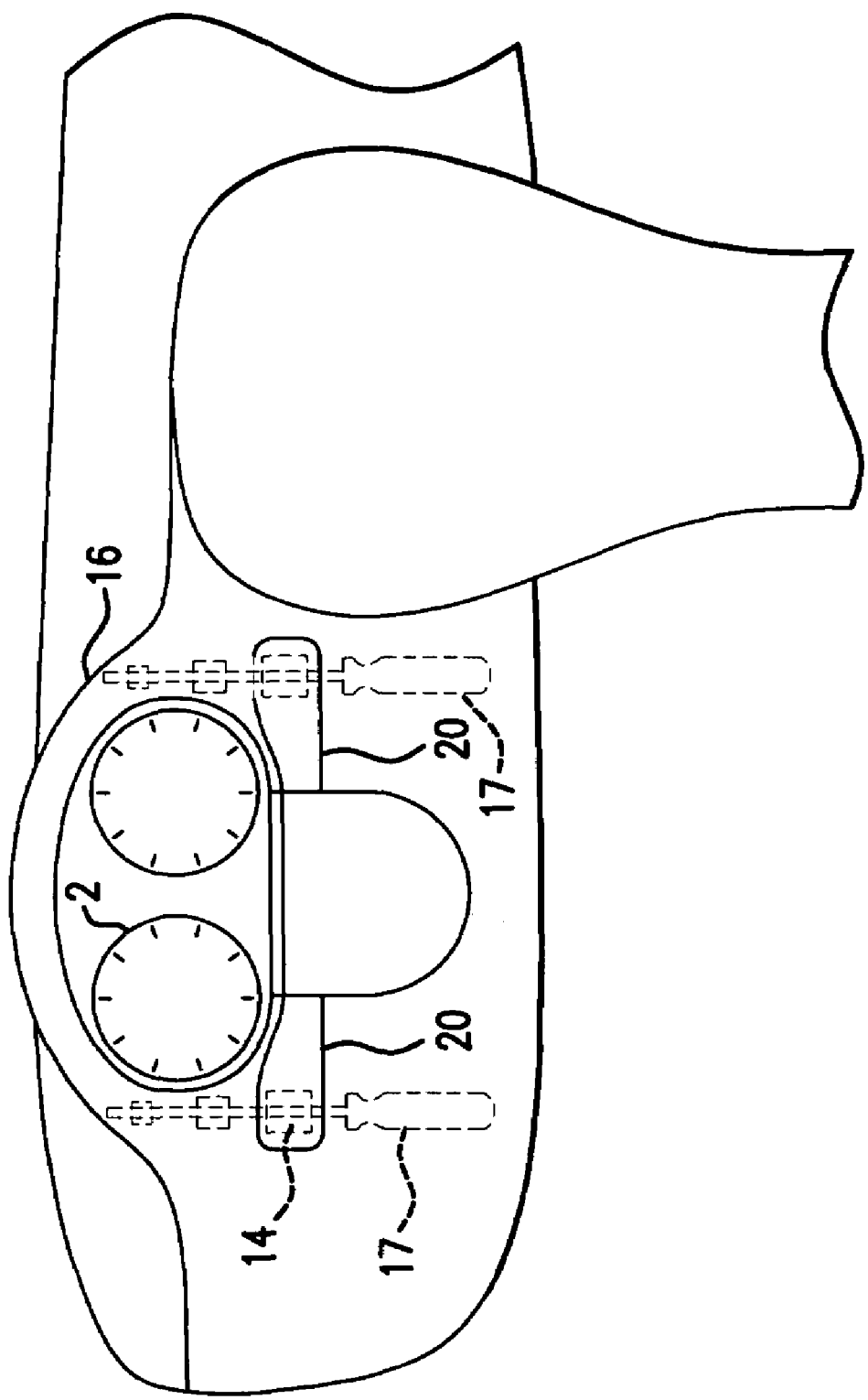

FIG. 6 shows a horizontal projection of instrument panel 16 with mounted instrument cluster 2. In this view, the device described with reference to FIGS. 1 to 5 is arranged on both sides of instrument cluster 2. Accordingly, instrument panel 16 also features holes, in which to insert screwdriver 17, on both sides of instrument cluster 2.

Diverging from the embodiment of FIGS. 1 to 5, there are no corresponding holes in the trim strip; instead, the holes are covered by removable trim strips 20. To dismount instrument cluster 2, these trim strips 20 are removed on both sides. Screwdrivers are then inserted, essentially simultaneously, in each of the two uncovered holes 14 and an actuating force is exerted on both sides by pressing on screwdriver 17 in the direction of instrument panel 16. In this manner, the snap connection that secures instrument cluster 2 is released and instrument cluster 2 is pushed a certain distance out of instrument panel 16.

LIST OF REFERENCE NUMBERS support frame 1
instrument cluster 2
protrusion 3
clip 4
shaft 5
nib 6
lever 7
notch 8
actuating projection 9
overhang 10
rising inclination 11
cross bar 12
receiver 13
hole 14
detent hook 15
instrument panel 16
screwdriver 17
trim strip 18
hole 19
trim strip 20

What is claimed is:

1. An apparatus for mounting an instrument cluster in a vehicle with a vehicle interior and having a support frame comprising, an instrument cluster; a releasable snap connection having a first element fixed to the support frame of the vehicle and a second element fixed to the instrument cluster such that the elements releasably engage to form the snap connection that holds the instrument cluster on the support frame of the vehicle; a lever having opposite ends pivotally mounted on the support frame; one end of the lever being adapted to be engaged by a tool inserted from the vehicle interior; the other end of said lever having an actuating member such that when the lever is pivoted, the actuating member will contact the snap connection and release the elements thereof, freeing the instrument cluster for movement toward the vehicle interior for removal thereof.

2. The apparatus according to claim 1 wherein the snap connection is designed to allow elastic deformation to effect release of the elements.

3. The apparatus according to claim 1 wherein the other end of the lever has a cross bar to engage the instrument cluster to urge it out of its mounting when the snap connection is released.

4. The apparatus according to claim 1 wherein one of the elements of the snap connection is resilient.

5. The apparatus according to claim 3 wherein a resilient member is interposed between the cross bar and the instrument cluster that biases the instrument cluster away from its mounting on the support frame.

6. The apparatus according to claim 1 wherein the actuating member includes an incline.

7. The apparatus according to claim 3 wherein the actuating member is positioned relative to the cross bar such that the snap connection is released before the cross bar engages the instrument cluster.

8. The apparatus according to claim 1 wherein a holding member is provided to engage and releasably hold the said one end of the lever in a predetermined position, when the instrument cluster is mounted on the support frame and held thereon by the snap connection.

9. The apparatus according to claim 8 wherein the holding member is a detent hook.

10. The apparatus according to claim 1 wherein the path from the vehicle interior to the one end of the lever is defined by a hole through which a tool can be inserted.

11. The apparatus according to claim 1 wherein the one end of the lever is fitted with a tool receiver for engagement with the inserted tool.

12. The apparatus according to claim 1 wherein a releasable snap connection is provided on opposite sides of the instrument cluster, contacting with its respective lever.

13. A method for mounting an instrument cluster on a support frame of a vehicle having a vehicle interior comprising the steps of: providing a releasable snap connection having a first element fixed to the support frame of the vehicle and a second element fixed to the instrument cluster such that the elements releasably engage to form the snap connection that holds the instrument cluster on the support frame of the vehicle; providing a lever having opposite ends pivotally mounted on the support frame with one end of the lever being adapted to be engaged by a tool inserted from the vehicle interior and the other end of said lever having an actuating member such that when the lever is pivoted, the actuating member will contact the snap connection and release the elements thereof, freeing the instrument cluster for movement toward the vehicle interior for removal thereof; mounting the instrument cluster on the support frame by engaging the snap connection; inserting a tool from the vehicle interior to engage the one end of the lever; pivoting the lever by exerting thrust on the tool; releasing the snap connection; positively urging the instrument cluster away from its mounting toward the vehicle interior; and removing the instrument cluster from the vehicle interior.

14. The method according to claim 13 including the step of elastically deforming the snap connection to effect release.

15. The method according to claim 13 including the step of biasing the instrument cluster, when mounted, toward the vehicle interior.

16. The method according to claim 13 wherein the step of positively urging the instrument cluster away from its mounting toward the vehicle interior occurs after the step of releasing the snap connection.

* * * * *